United States Patent [19]
Dominguez

[11] Patent Number: 5,941,012
[45] Date of Patent: Aug. 24, 1999

[54] POWER ROD EXTENSION

[76] Inventor: Michael J. Dominguez, 1224 Terrel Rd., Mobile, Ala. 36605

[21] Appl. No.: 08/853,470

[22] Filed: May 9, 1997

[51] Int. Cl.⁶ .................................................. A01K 97/10
[52] U.S. Cl. .......................... 43/21.2; 248/689; 248/535; 43/25
[58] Field of Search ................................ 43/21.2, 25, 22, 43/23, 20; 224/922; 294/19.1; 248/689, 535

[56] References Cited

U.S. PATENT DOCUMENTS

| | | | |
|---|---|---|---|
| 2,000,263 | 5/1935 | Teetor . | |
| 2,158,104 | 5/1939 | Bowen . | |
| 2,761,236 | 9/1956 | Gaston . | |
| 3,367,056 | 2/1968 | Johnson | 43/25 |
| 3,669,390 | 6/1972 | Nielson | 248/42 |
| 4,041,635 | 8/1977 | Savage | 43/25 |
| 4,190,977 | 3/1980 | Casper | 43/25 |
| 4,546,566 | 10/1985 | Corrente | 43/25 |
| 4,559,735 | 12/1985 | Batick, Jr. | 43/25 |
| 5,159,775 | 11/1992 | Satula, Jr. | 43/21.2 |
| 5,212,900 | 5/1993 | Perry | 43/21.2 |
| 5,390,438 | 2/1995 | Warren, Jr. | 43/21.2 |
| 5,426,884 | 6/1995 | Makowsky | 43/25.2 |

FOREIGN PATENT DOCUMENTS

WO91/09518  7/1991  WIPO ........................................ 43/25

*Primary Examiner*—Jack W. Lavinder
*Attorney, Agent, or Firm*—Patent & Trademark Services; Joseph H. McGlynn

[57] ABSTRACT

A rest for a fishing pole which will not only add additional support for a fishing pole, but will also transfer some of the shock to a user's arm, thereby protecting the user's wrist. It comprises a rest which is attached to the fishing pole and has an arm which fits under the user's forearm to provide support. In addition, the device includes a strike strength meter which will indicate the weight of a fish on the line. Also, the extension arm has a storage container incorporated therein for small fishing accessories. In the alternative, the storage container can be a separate item which is attached to the extension arm. In addition the arm may contain a blister which contains air in order to make the device float.

11 Claims, 1 Drawing Sheet

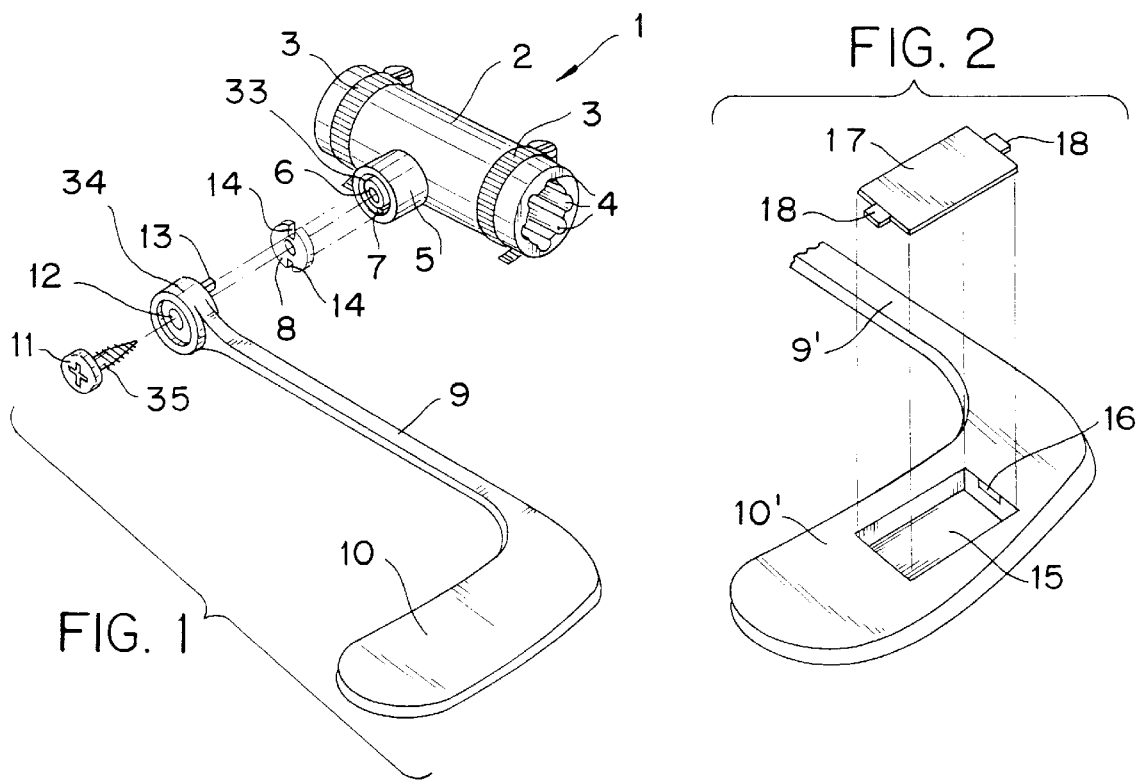
FIG. 1
FIG. 2
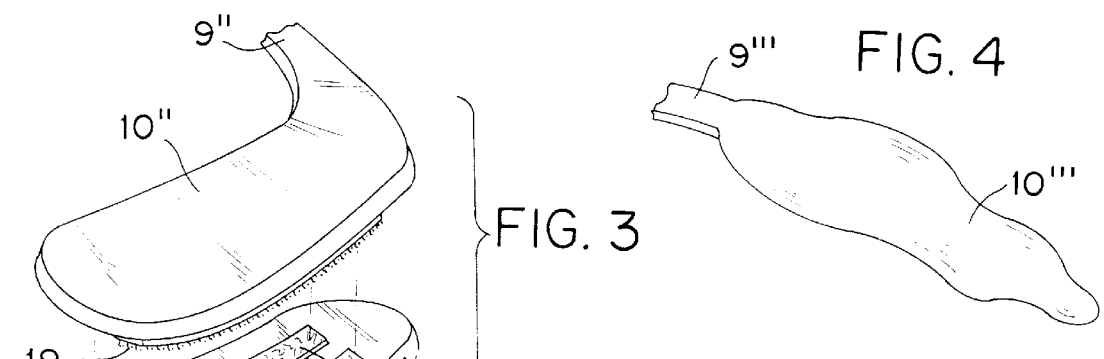
FIG. 3
FIG. 4
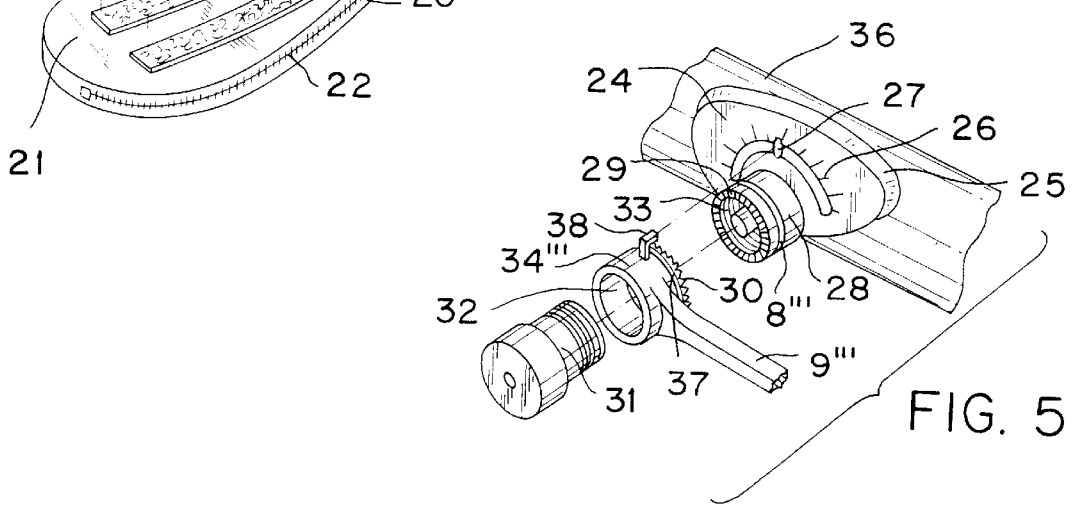
FIG. 5

POWER ROD EXTENSION

BACKGROUND OF THE INVENTION

The present invention relates in general to a fishing rod rest, and more particular to a forearm rest or supporting device having a rod engaging portion for attachment to the handle of a fishing rod and having a portion which extends normally and accommodates the forearm of a fisherman. In addition, various attachments which are useful while fishing are incorporated into the fishing rod rest.

DESCRIPTION OF THE PRIOR ART

In the prior art various types of forearm rests have been proposed. For example, U.S. Pat. No. 4,190,977 discloses a forearm rest for assisting an angler in holding a fishing rod. The rest has a circular portion that is secured to the rod and has a curved portion extending therefrom to engage the fisherman's forearm. While this rest will work, it is easily bent out of shape and does not incorporate any fishing related attachments.

U.S. Pat. No. 4,546,566 discloses another rest that comprises an upwardly curved clamp and a downwardly curved clamp which are positioned on opposite sides of a fishing rod and then pivoted so that the clamps engage opposite sides of the rod. The curved clamps are attached to a member which can be looped onto a fisherman's belt to help hold the rod. This device is unstable because the rod can be easily pivoted out of the clamps in the opposite direction from which it is engaged with the clamps. In addition, the belt attachment is at best clumsy to attach, and time consuming. Also, the rest does not support the angler's arm, which will eventually lead to fatigue.

U.S. Pat. No. 4,559,735 discloses a holding apparatus for a fishing rod which has a pair of padded clamps which are spring biased together. A user's hand is pushed between the clamps which securely hold the user's hand. The device also includes two ring clamps to attach the device to a fishing rod. Again, this type of device is designed to help hold a fishing rod without giving any significant support to a fisherman's forearm. Also, the device is awkwardly large and could interfere with the normal use of the fishing rod and/reel. In addition there are no attachments nor room to place any attachments.

U.S. Pat. No. 5,159,775 discloses a fishing rod which comprises an elongated support that attaches at one end to the handle of a fishing rod, and at the other end to a user's arm with a VELCRO hook and loop type fastener. This device, since it is in direct line with the longitudinal axis of the rod, will hold the user's arm and wrist at an unnatural, and therefore uncomfortable angle.

U.S. Pat. No. 5,390,438 discloses an arm support with a removable curved extension which fits beneath the fisherman's forearm. Mounting of the arm support extension to the rod may be by either threading it to interior threads in the section or fixedly mounting it therein. The threadedly mounted embodiment has an internally threaded rod handle cavity which engages external threads on the arm support extension to secure these members together.

Other support mounts employ a configured wire brace, U.S. Pat. No. 3,669,390 to C. Nielson, which cradles the rod to hold it upright.

U.S. Pat. No. 5,212,900 discloses a pair of braces that encircle the forearm and upper arm of the user and are hinged together. One of the braces has a support that attaches to a fishing pole.

What is needed is a rest that will give adequate support to a fisherman's wrist, and is easily attached to a rod so it can be moved from one rod to another. Also, the rest should have a shock absorbing feature that will alleviate some of the strain imposed, when a fish strikes the bait, from traveling down the rod into the wrist of the user. This is especially important for fisherman who suffer from ailments such as arthritis and bursitis. In addition the rest should incorporate fishing accessories that will make the sport of fishing more pleasant and easier.

SUMMARY OF THE INVENTION

The present invention is directed to a rest for a fishing pole which will not only add additional support for a fishing pole, but will also absorb some of the shock so it will not be transferred to a user's wrist. It comprises a rest which is attached to the fishing pole and has an arm which fits under the user's forearm to provide support. The arm is attached to the rest with a shock absorber interposed to protect the user's wrist. In addition, the device includes a strike strength meter which will indicate the weight of a fish on the line. Also, the extension arm has a storage container incorporated therein for small fishing accessories. In the alternative, the storage container can be a separate item which is attached to the extension arm. In addition the arm may contain a blister which contains air in order to make the device float.

It is an object of the present invention to provide a new and improved extension for a fishing pole.

It is an object of the present invention to provide a new and improved extension for a fishing pole which will alleviate strain on a user's wrist by bracing the hand and the forearm.

It is an object of the present invention to provide a new and improved extension for a fishing pole which has fishing accessories attached thereto.

These and other objects and advantages of the present invention will be fully apparent from the following description, when taken in connection with the annexed drawings.

BRIEF DESCRIPTION OF THE DRAWINGS

FIG. 1 is a perspective exploded view of the present invention.

FIG. 2 is a partial perspective exploded view of the present invention.

FIG. 3 is a partial perspective exploded view of another embodiment of the present invention.

FIG. 4 is a partial side view of another embodiment of the present invention.

FIG. 5 is a partial perspective exploded view of another embodiment of the present invention.

DESCRIPTION OF THE PREFERRED EMBODIMENT

Referring now to the drawings in greater detail, FIG. 1 shows the present invention 1, which comprises a deformable sleeve 2 which can be passed over the end of a handle of a conventional fishing rod (not shown). The inside of the sleeve 2 is provided with undulations or serrations 4 which will grip the outside of the handle to prevent the sleeve from turning or twisting with respect to the handle. Surrounding the sleeve 2 are at least two worm screw clamps 3 which can be used to deform the sleeve 2 unto the handle of the fishing pole. The sleeve 2 and the screw clamps 3 form means for attaching the support to a handle of a fishing rod. The worm screw clamps 3 can be molded with the sleeve 2 or they can be separate items.

Attached to one surface of the sleeve 2 is a circular protrusion 5 with a central aperture 6 and a second, coaxial aperture 33. Also, a fixed protrusion 7 is disposed on the inner wall of the circular protrusion 5. A washer 8 which can be made from, but not limited to, rubber, fits within the coaxial aperture 33 and has slots 14. One of the slots 14 will engage with the protrusion 7, while the other slot 14 will receive the projection 13 on the circular hub 34. A handle 9 with a circular hub 34 on one end is attached to the circular protrusion 5 by means of a screw 11 which passes through aperture 12 in the circular hub 34, through the washer 8, and then into the aperture 6. The screw 11 thus forms a detachable means for rotatably securing the extension arm.

In operation, the handle 9 would rotate freely about the smooth portion 35 of screw 11 if the disk 8 were not in place. However, the circular hub 34 is connected to the disk 8 by the projection 13, and the disk is fixed within the protrusion 5 by the slot 14 engaging with the protrusion 7. This means when the handle 9 tries to pivot about the smooth portion 35 of screw 11, the rubber disk 8 will be compressed between the projections 7 and 13, which will absorb some of the shock that would normally be transferred to the wrist of the user.

The handle 9 or extension arm has a first portion which is substantially parallel to the longitudinal axis of the fishing rod which will be received in the sleeve 2 and has a second portion 10 of the extension arm, which extends at substantially a right angle from the first portion attached to the other end. The second portion 10 will fit under the forearm of the user to provide additional support for the user. It should be noted that the present invention is disclosed as mounted on a fishing pole for a right handed person. However, it can be adapted for a left handed person by rotating the sleeve 180° and retightening the sleeve onto the fishing pole.

In addition, while the present invention has been shown as a separate device which is attached to a fishing pole, it could also be made as a unitary part of a new fishing pole by molding the protrusion 5 into the handle 36 of the fishing rod as shown at 28 in FIG. 5.

In use the fisherman normally holds the handle of the fishing rod in the palm of his hand, and has the underside of his/her forearm resting on the extension arm 10. Thus, the fisherman assumes a natural and comfortable position with his/her forearm making a slight or acute angle with respect to the longitudinal axis of the fishing rod. The handle 9 and extension arm 10 does not interfere in any way with the fisherman's ability to cast the bait or lure.

The fishing rod extension of the present invention has several advantages. First, it provides a stabilizing brace which removes the strain from the wrist of the user when fishing, by allowing the forearm of the user to help support the weight of the rod.

Second, when a fish takes the bait the weight of the fish is amplified by the length of the rod. The rod acts as a moment arm and the weight of the fish, multiplied by the length of the arm, equals the force applied to the user's wrist. The present invention reduces this strain by the use of the arm extension 10, as explained above.

In FIG. 2, a second improvement in the present invention is shown. An compartment 15 is placed in the extension arm 10'. A pair of slots 16 (only one of which is shown in FIG. 2) are placed in the walls of the compartment 15. A lid 17 for closing the compartment has a pair of protrusions 18 affixed thereto. The lid should be made from a material that has a slight amount of flexibility such as, but not limited to, plastic. The compartment can be used to store items such as fish hooks, and the lid can be slightly flexed so the protrusions 18 will snap into the slots 16 and thereby hold the lid on the compartment.

Another storage compartment is shown in FIG. 3. It should be noted that the compartment shown in FIG. 3 can be used in addition to, or instead of, the compartment shown in FIG. 2. The compartment of FIG. 3 is a separate pouch 21 which has a pair of strips of VELCRO type hook and loop fasteners 20 attached to one side and the complimentary have of the VELCRO type hook and loop fasteners 19 will be attached to the underside of the arm 10". The pouch 21 can have a closure such as, but not limited to, a zipper 22 which will allow fishing items such as hooks, sinkers, etc. to be stored in the pouch 21.

In FIG. 4 another improvement to the present invention is shown. This improvement can be used with any of the extension arms shown in the drawings. The arm 10''' is hollow and is provided with a "bubble" 23. The hollow arm and bubble are of a size to hold approximately one liter of air. Therefore if the rod falls into the water, the air trapped inside will help the rod to float until a user can retrieve it.

In FIG. 5, another embodiment of the present invention is shown. In this embodiment the circular projection 28 is made as a unitary part of the fishing pole handle 36, however it could also be made as a separate piece and attached to the pole in a manner similar to the FIG. 1 embodiment. Attached to member 28 is a strike meter 24 which has a movable marker 27 which can move within the slot 25, and a graduated scale with markings 26 which will indicate the weight of the fish or the force of the strike. Projection 38 on the arm 9''' will engage marker 27 and will move the marker when a fish is caught.

Attached to the face of hub 34''' (by any conventional means) is a rubber washer or disk 37, similar to disk 8 except disk 37 has a plurality of serrations or projections 30 on the face thereof. Attached to the face of projection 28 is a similar disk 8''' with serrations or projections 29 which will engage the serrations or projections 30 when the arm 9''' is attached by means of screw 31.

By loosening screw 31 a fisherman can adjust the position of the arm 9''' to any position that is comfortable for him/her. Then by tightening the screw 31, the projections 29, 30 will hold the arm in the set position. The projections 29, 30 will perform the same function as the projections 7, 13 and the slots 14 in the FIG. 1 device (i.e. they will absorb shock).

It should be understood that while the various embodiments in FIGS. 1–5 have been shown in separate figures, they could be combined in one device. For example the storage containers of FIGS. 2 and 3 could be used with the arms of FIGS. 1, 4 or 5. In addition both storage containers could be used at the same time.

Although the Power Rod Extension and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A support and extension arm adapted to be attached to a handle of a fishing rod and which will engage the forearm of a fisherman to aid in supporting the fishing rod, comprising:

means for attaching said support to a handle of a fishing rod,
   said means having detachable means for rotatably securing said extension arm thereto,
said extension arm being substantially L-shaped and having a first portion extending substantially parallel to a longitudinal axis of said fishing rod, and a second portion extending at substantially a right angle from said first portion,
   said first portion having a projection thereon,
a resiliently deformable means having at least a pair of slots positioned thereon,
said support having a projection thereon,
   said projection on said first portion engaging one of said pair of slots on said resiliently deformable means,
   said projection on said support engaging another of said pair of slots on said resiliently deformable means.

2. The support and extension arm adapted to be attached to a handle of a fishing rod as claimed in claim 1, wherein said support is a unitary part of said fishing pole handle.

3. The support and extension arm adapted to be attached to a handle of a fishing rod as claimed in claim 1, wherein said support is separate from said fishing pole handle and is attached thereto by at least a pair of clamps.

4. The support and extension arm adapted to be attached to a handle of a fishing rod as claimed in claim 1, wherein said extension arm has storage means attached thereto.

5. The support and extension arm adapted to be attached to a handle of a fishing rod as claimed in claim 4, wherein said storage means is a compartment formed in said second portion of said extension arm.

6. The support and extension arm adapted to be attached to a handle of a fishing rod as claimed in claim 5, wherein said storage means has a lid attached thereto for closing said storage means.

7. The support and extension arm adapted to be attached to a handle of a fishing rod as claimed in claim 4, wherein said storage means is a separate element with a closable opening therein, and
   said storage means has detachable securing means for attaching said storage means to said said second portion of said extension arm.

8. The support and extension arm adapted to be attached to a handle of a fishing rod as claimed in claim 7, wherein said detachable securing means is a hook and loop fastener.

9. The support and extension arm adapted to be attached to a handle of a fishing rod as claimed in claim 1, wherein said extension arm is hollow and has an enlarged portion thereon,
   whereby air within said extension arm will enable the holder to float.

10. The support and extension arm adapted to be attached to a handle of a fishing rod as claimed in claim 1, wherein said support has a slot positioned thereon,
   a movable marker positioned within said slot,
   indicia means adjacent to said slot
   said first portion of said extension arm having a second projection thereon,
      said second projection engageable with said movable marker and which will move said movable marker to indicate the weight of a fish.

11. A support and extension arm adapted to be attached to a handle of a fishing rod and which will engage the forearm of a fisherman to aid in supporting the fishing rod, comprising:
   means for attaching said support to a handle of a fishing rod,
      said means having detachable means for rotatably securing said extension arm thereto,
   said extension arm being substantially L-shaped and having a first portion extending substantially parallel to a longitudinal axis of said fishing rod, and a second portion extending at substantially a right angle from said first portion,
      said first portion having a resiliently deformable means with a plurality of projections thereon,
   said support having a resiliently deformable means with a plurality of projections thereon,
      said projections on said first portion engaging said projections on said support,
      whereby said resiliently deformable means will transfer any shocks transmitted from said fishing pole to said extension arm, and said detachable means for rotatably securing said extension arm can be loosened, said extension arm can be moved to a new position with respect to said support and said detachable means for rotatably securing said extension arm can be tightened whereby said projections on said first portion and said holder will engage and support said extension arm in said new position.

\* \* \* \* \*